May 31, 1932. L. S. MORSE 1,860,588
TIRE PRESSURE MEASURING TOOL
Filed June 13, 1928
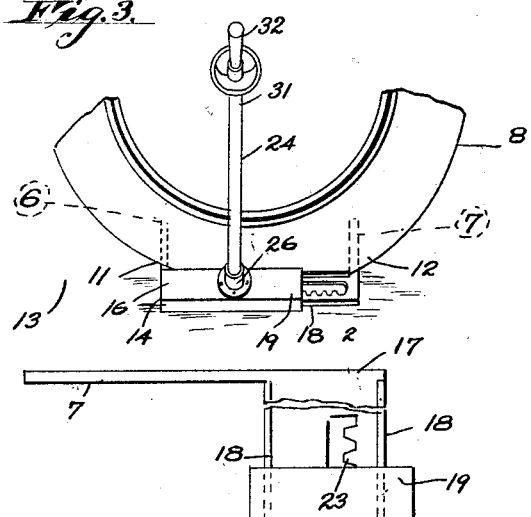
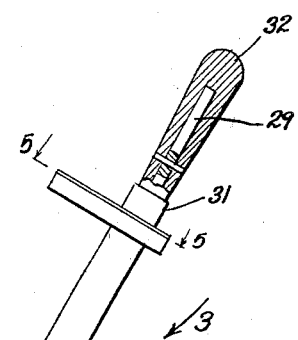
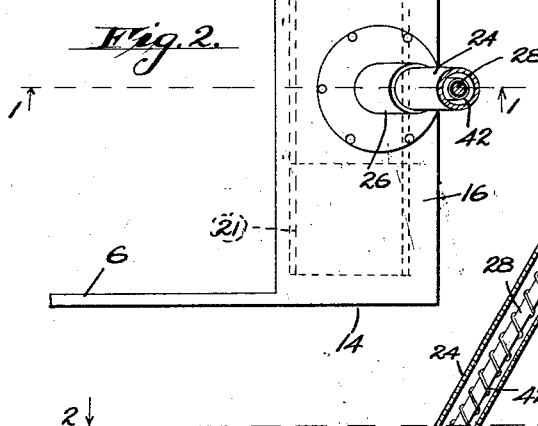
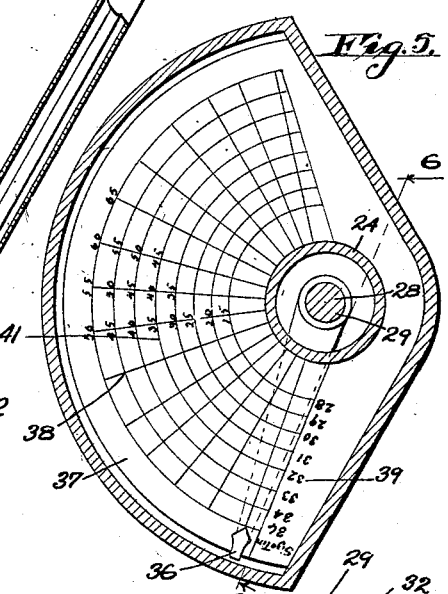
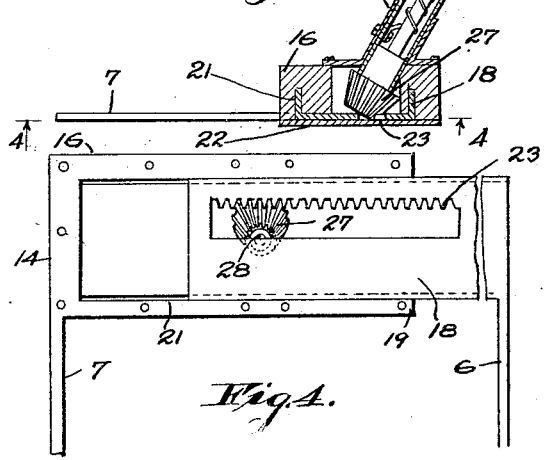
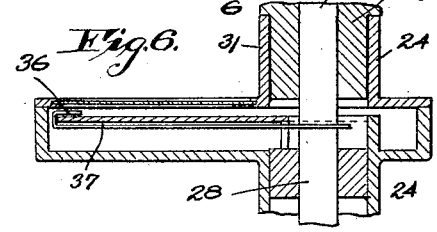
Inventor
Lulan S. Morse
by Hazard and Miller
Attorneys Patented May 31, 1932

1,860,588

UNITED STATES PATENT OFFICE

LULAN S. MORSE, OF OCEAN PARK, CALIFORNIA

TIRE PRESSURE MEASURING TOOL

Application filed June 13, 1928. Serial No. 284,990.

This invention relates to tire pressure gauges.

An object of the invention is the provision of a device by means of which the pressure within a pneumatic tire may be easily and accurately determined.

A more detailed object is the provision of a pneumatic tire pressure gauge provided with a pair of opposed members movable to engage opposite portions of a pneumatic tire to determine the distance between those portions and which is provided with a dial and an indicator movable thereacross proportionally with the relative movement of the tire-engaging members to indicate the pressure within the tire.

This invention possesses other objects and features of advantage, some of which, with the foregoing, will be set forth in the following description of the preferred form of the invention which is illustrated in the drawings accompanying and forming part of the specification. It is to be understood that I do not limit myself to the showing made by the said drawings and description, as I may adopt variations of the preferred form within the scope of my invention as set forth in the claim.

Referring to the drawings:

Figure 1 is a vertical sectional view of my improved tire pressure gauge with a portion of the operating handle shown in elevation. The plane of section is indicated by the line 1—1 of Fig. 2.

Fig. 2 is a horizontal sectional view taken through the handle of the device, and showing the major portion thereof in plan view. The plane of section is indicated by the line 2—2 of Fig. 1, and a portion of the figure is broken away to reduce its length.

Fig. 3 is a perspective view showing the manner of applying my improved tire pressure gauge to a pneumatic tire. The direction of view is indicated by the arrow 3 of Fig. 1.

Fig. 4 is a horizontal sectional view, with the plane of section taken upon the line 4—4 of Fig. 1, and with the direction of view indicated by the arrows.

Fig. 5 is a transverse sectional view of the handle, taken upon the line 5—5 of Fig. 1, to show the indicator and dial in plan.

Fig. 6 is a vertical sectional view of the dial, the plane of section being taken upon the line 6—6 of Fig. 5, with the direction of view indicated by the arrows.

In its broad conception, the pressure gauge of the present invention comprises a pair of opposed members movable toward and or away from each other, to engage or release opposite portions of pneumatic tire. It is to be understood that the device is to be so positioned in use that the tire-engaging members engage portions of the tire, which are moved in respect to each other by change of pressure within the tire, with the result that the tire-engaging members will be spaced differently for each different degree of inflation. An indicator is operatively connected to one of the tire-engaging members to be moved across a dial proportionally with the relative movement of the members; and the dial is graduated to indicate the degree of inflation of the tire for each position of the indicator.

In its preferred embodiment, the tire pressure gauge of the present invention, comprises a pair of opposed tire-engaging members 6 and 7, adapted to be positioned in engagement with opposite portions of a pneumatic tire 8. It is well known that when the weight of a vehicle is supported upon a pnuematic tire, the area of contact of that tire with the floor or ground, varies inversely with the degree of inflation; i. e., the higher the inflation pressure within the tire, the less the area of contact of the tire with the ground. Accordingly, I have devised my tire pressure gauge so that the tire-engaging members 6 and 7 are to be engaged with those portions 11 and 12 of the tire 8, which are at opposite ends of the area of contact of the tire 8 with the supporting surface 13 upon which the tire rests. Consequently, if the pressure within the tire 8 is relatively low, resulting in a greater distance between the points 11 and 12, the spacing between the tire-engaging members 6 and 7 when brought snugly into engagement with the tire 8 between it and the surface 13, will be greater than were the pressure within the tire of a higher value.

Means are provided for manipulating the members 6 and 7 to bring them into proper engagement with the portions 11 and 12 of the tire 8. The tire-engaging member 6 is rigid with, and extends laterally from adjacent one end 14 of the body portion 16 of my improved tire pressure gauge; and the other tire-engaging member 7 is rigid with, and extends laterally from the outer end 17 of a plate 18 which is slidably mounted upon the body 16 to permit its being extended from the other end 19 thereof to separate the tire-engaging members 6 and 7, or to be withdrawn into the body portion 16 to decrease the distance between the members 6 and 7.

In order to add to the rigidity thereof, the plate 18 may conveniently be formed of a length of channel iron, as clearly shown in Fig. 1, for the reception of which a complementarily shaped guideway 21 is formed in the under side of the body portion 16. A plate 22 is secured to the under side of the body portion 16 to retain the plate 18 within its guideway 21, and to permit longitudinal movement thereof in respect to the body portion 16.

The plate 18 is provided with rack teeth 23; and a tube 24 secured at its lower end to the body 16 as by a flanged socket 26, provides a journal for a pinion 27, the teeth of which are enmeshed with the teeth of the rack 23 so as to effect longitudinal movement of the plate 18 in respect to the body 16 by rotary movement of the pinion 27. The pinion 27 is affixed to the lower end of a shaft 28 which extends upward through the tube 24 with its upper end 29 extending beyond the upper end 31 of the tube 24. The tube 24 serves as a standard to support in a conveniently elevated location, a handle 32 which is secured to the upper end 29 of the shaft 28 whereby rotary movement may be imparted to the shaft and pinion 27.

It is readily apparent from the structure thus far described, that the device may be rested upon the surface 13 alongside the tire 8, the pressure within which it is desired to determine; and then by turning the handle 32 to so adjust the spacing between the members 6 and 7 that they may be snugly engaged with the portions 11 and 12 respectively of the tire 8 and between these portions and the surface 13. It is also apparent that the spacing between the arms 6 and 7 is dependent upon the degree of pressure within the tire 8, and consequently, the number of degrees of rotation of the shaft 28 within the tube 24 to effect this adjustment of the members 6 and 7, is likewise dependent upon the pressure within the tire 8. Accordingly, it is convenient to determine the pressure within the tire 8 by means of an indicating hand 36 which is mounted upon the shaft 28 for movement therewith over a dial 37 which is carried by the tube 24, preferably at a conveniently elevated location adjacent its upper end.

Preferably the dial 37 is provided with a series of individual scales 38, each of which is to be used in reading the instrument for determining the pressure of a different size of pneumatic tire 8. The reason for this is that a greater surface of a large size tire will bear upon the supporting surface 13 than will be the case with a smaller tire, the pressures in both tires being the same. Accordingly, in order to make my pressure gauge adaptable for universal application, a scale 38 is provided for each of several different tire sizes; and each scale 38 is provided with an indicium 39 by means of which the proper scale to be used with a certain size tire may be identified.

Further, each of the scales 38 is provided with indicia 41, indicating the position which will be assumed by the indicator 36 in respect to that scale when the tire-engaging members 6 and 7 have been brought into engagement with the tire 8 when a certain pressure obtains within the tire.

A spring 42 is preferably coiled about the shaft 28 within the tube 24, and is affixed at one end to the shaft and at the other end to urge the shaft 28 to that extreme of its rotary movement at which the members 6 and 7 are spaced farthest apart.

The manner of operating my improved tire pressure measuring tool is substantially as follows:

When it is desired to determine the pressure within a pneumatic tire 8, the tool is grasped with one hand adjacent the upper end of the tube 24. The tool is then placed upon the surface 13 alongside the tire 8, with the stationary tire-engaging member 6 in engagement with the portion 11 of the tire 8 at one end of the area of contact thereof with the surface 13. The operator then grasps the handle 32 with his other hand and turns the handle against the action of the spring 42 to bring the other tire-engaging member 7 into engagement with the portion 12 of the tire 8 at the other end of the area of contact thereof with the surface 13. Then by observing the position of the indicating hand 36 in respect to the proper scale 38 corresponding to the size of the tire 8, the pressure of which is in question, that pressure may be read directly from the scale. It is to be understood of course, that universally, tires are marked to indicate their size, so that the operator can readily determine which of the scales 38 is to be read each time the tool is employed.

I claim:

A tire pressure gage comprising a body portion, a plate slidable longitudinally thereon, a tire-engaging member rigid with said body and a second tire-engaging member rigid with said plate, both of said members extending laterally with respect to said body and plate and being adapted to engage a tire adjacent opposite ends of the area of contact of the tire with its supporting surface with said body resting upon said surface alongside said tire, a tube rigid with said body and extending upwards therefrom, a shaft journaled within said tube and projecting beyond the upper end thereof to provide a handle accessible to a person standing adjacent said tire, a pinion rigid with said shaft, rack teeth on said plate enmeshed by said pinion to move said plate upon rotary movement of said shaft, a dial carried by said tube, and an indicator carried by said shaft in position to be moved over said dial as said shaft is turned.

In testimony whereof I have signed my name to this specification.

L. S. MORSE.